May 13, 1930.  M. F. CARR  1,758,908
SEPARABLE FASTENER
Filed Oct. 5, 1928

Inventor:
Moses F. Carr
by Emery, Booth, Janney & Varney
Attys

Patented May 13, 1930

1,758,908

UNITED STATES PATENT OFFICE

MOSES F. CARR, OF LEXINGTON, MASSACHUSETTS, ASSIGNOR TO UNITED-CARR FASTENER CORPORATION, OF CAMBRIDGE, MASSACHUSETTS, A CORPORATION OF MASSACHUSETTS

SEPARABLE FASTENER

Application filed October 5, 1928. Serial No. 310,658.

My invention aims to provide improvements in separable fasteners and more particularly to fastener elements having means by which they are adapted to be secured to sheet metal structures.

In the drawings, which illustrate a preferred embodiment of my invention:—

Figure 5:
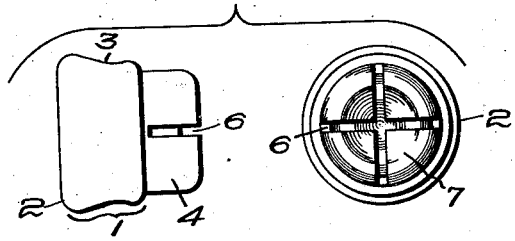

Fig. 5 includes a side elevation and a rear elevation, respectively, of a fastener stud member before attachment to a support.

Referring to the embodiment of my invention illustrated by the drawings, I have shown a fastener stud unit which is particularly, though not exclusively, adapted for attachment to a relatively thin supporting structure such as sheet metal.

Figure 1:
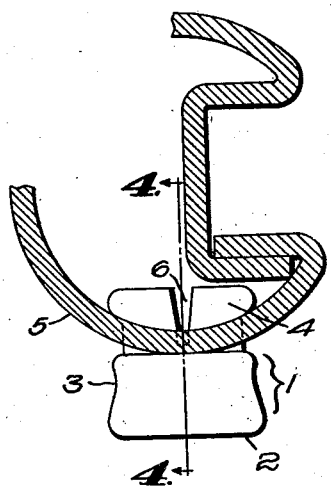
Figure 1 is a plan section taken through a portion of a wind shield post showing a fastener stud member secured thereto.
Figure 4:
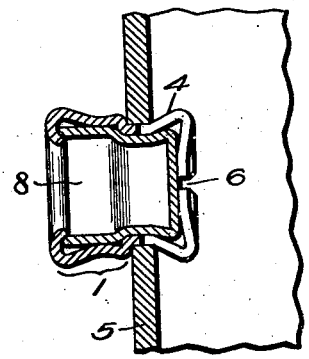
Fig. 4 is a section taken on the line 4—4 of Fig. 1.

The stud unit illustrated has a hollow body portion preferably formed from a single piece of sheet metal pressed out to the desired shape. In this instance, I have provided a socket-receiving portion 1 at one end which includes the head portion 2 and neck 3. At the other end, I have provided a cup-shaped attaching portion 4 integral with the socket-receiving portion 1 and having an outer peripheral wall which is adapted to be expanded to secure the fastener unit to a support 5, as shown in Figs. 1 and 4.

The attaching portion is preferably divided by slits 6 so that the outer wall may be easily expanded. At the bottom of the attaching portion, I have provided an inwardly extending hump 7 adapted to be flattened to expand the attaching portion in a manner hereinafter described. One end of each of the slits 6 terminates short of the socket-receiving portion 1 (Figs. 2, 3 and 4) so as to prevent the passage of dirt, water or dust when the fastener element is attached to a support. The other end of each slit terminates at the center of the hump 7 thereby making the attaching portion readily expansible.

Figure 2:
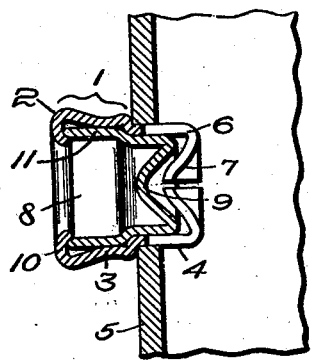
Fig. 2 is a section of the stud member and supporting structure, showing the fastener member before the attaching means has been expanded.
Figure 3:
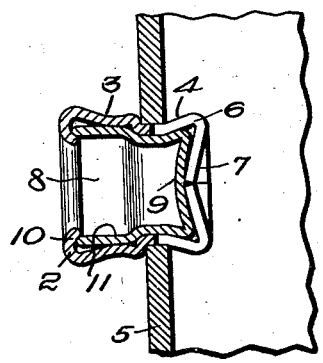
Fig. 3 is a section of the stud member and support, the attaching means being shown as partly expanded.

Within the fastener body, I have provided a cup-shaped closure element 8 having a hump portion 9 in the bottom thereof. This closure element is assembled in fixed relation within the body of the fastener, at the point of manufacture, by simply rolling the wall 10, at the open end of the socket-receiving portion 1, over the open edge of the closure element, as shown in Figs. 2, 3 and 4. The cylindrical portion 11 of the closure element makes a tight fit with the inner wall of the body part and, therefore, as the closure element is imperforate, dust, dirt and water cannot pass through the fastener.

The method of attachment is simple and particularly adapted for securing fastener elements to sheet metal objects and for use on objects such as wind shield posts (Fig. 1), the inside of which is not accessible.

When securing a stud unit to a wind shield post, as shown in the drawings, the attaching portion 2 is passed into a pre-formed hole, as shown in Fig. 2. Then a suitable tool (not shown) is inserted in the open end of the fastener and pressed against the end of the hump portion 9, thereby to flatten the hump and force it against the hump 7 which in turn is flattened, as shown in Figs. 1 and 4.

During the attaching operation, the hump 9 is pressed against the hump 7 and as the hump 7 flattens the ends of the split portions of the attaching portion, contact with each other (Fig. 3). Further flattening of the hump 7 spreads the yieldable portions of the attaching portion laterally outwardly thereby securely attaching the stud unit, as shown in Fig. 4. The outer wall of the closure element 8 adjacent to the bottom is also expanded laterally to back-support the yieldable attaching portion so that the stud unit cannot be withdrawn under ordinary stresses exerted upon the stud through a socket when attached thereto.

If at any time it becomes necessary to remove a fastener element, attached to a support in the above-described manner, it is only necessary to drill a hole through the humps 7 and 9 so that a suitable tool may be inserted through the drilled hole to pull the fastener out of the hole in the support.

While I have illustrated and described a preferred embodiment of my invention, I do not wish to be limited thereto, as the scope of my invention is best defined by the following claims.

I claim:

1. A snap fastener element including a one-piece body part having fastener-engaging means adjacent to one end thereof, an expansible attaching portion at the other end, a cup-shaped member located within the body part and secured in fixed relation thereto and means forming a part of said cup-shaped member and adapted to expand the peripheral wall of the attaching portion to secure the fastener element to a support.

2. A snap fastener element having fastener-engaging means adjacent to one end thereof, an attaching portion at the other end having an integral distortable hump in the bottom thereof and a cup-shaped member located within the fastener element and having an edge and an annular shoulder cooperating with internal spaced shoulders located within the fastener-engaging means to secure the cup-shaped member in fixed relation thereto, and said cup-shaped member having a hump which when flattened will engage and distort the first-mentioned hump thereby to expand the peripheral wall of the attaching portion to secure the fastener element to a rigid support.

3. A snap fastener element including a one-piece body part formed from a single piece of metal having fastener-engaging means adjacent to one end thereof, an attaching portion at the other end substantially cup-shaped in cross-section, a hump in the bottom of said attaching portion, slits dividing the side wall and the bottom of said attaching portion and a cup-shaped member located within the fastener element and secured in fixed relation thereto, said cup-shaped member also having a hump which when flattened will engage and distort the first-mentioned hump thereby to expand the peripheral wall of the attaching portion to secure the fastener element to a rigid support.

4. A snap fastener element having fastener-engaging means adjacent to one end thereof, an attaching portion at the other end substantially cup-shaped in cross-section, a hump in the bottom of said attaching portion, slits dividing the side wall and the bottom of said attaching portion, an imperforate cup-shaped closure element assembled in fixed relation within the fastener element, a hump in the bottom of said closure element, and a flange located at the outer end of the fastener-engaging means and bent over the outer edge of the closure element thereby securing the two parts together to prevent passage of dust, dirt or water through the fastener element.

5. A fastener element having a body portion pressed from a single piece of metal and having an apertured stud portion at one end and an attaching portion extending from said stud portion, said attaching portion being slit to permit ease of expansion, means forming part of the attaching portion whereby said attaching portion may be expanded laterally, cup-shaped closure means fixed within the body portion for closing the slits in the attaching portion so that water or dirt passing into the fastener through the aperture in the stud head will be excluded from passing through the said slits, and means formed integral with said closure means for cooperation with the means forming part of the attaching portion to permit expansion of the said attaching portion.

In testimony whereof, I have signed my name to this specification.

MOSES F. CARR.